United States Patent
Abeltino

[11] Patent Number: 5,198,169
[45] Date of Patent: Mar. 30, 1993

[54] PROCESS FOR THE FORMING OF A COVERING ELEMENT FOR VEHICLE INTERIORS

[75] Inventor: Ettorê Abeltino, Chiasso-Vacallo, Switzerland

[73] Assignee: Ordinan Trading Ltd., London, Great Britain

[21] Appl. No.: 645,026

[22] Filed: Jan. 23, 1991

[30] Foreign Application Priority Data

Jan. 30, 1990 [IT] Italy ................. 19198 A/90

[51] Int. Cl.$^5$ ............................................. B29C 67/14
[52] U.S. Cl. ............................ 264/137; 156/196; 156/322; 264/257
[58] Field of Search ............... 264/257, 258, 136, 137; 156/245, 196, 322

[56] References Cited

U.S. PATENT DOCUMENTS

| | | | |
|---|---|---|---|
| 3,556,448 | 1/1971 | Dobbs | 52/309.11 |
| 3,558,395 | 1/1971 | Plegat | 428/480 |
| 3,616,112 | 10/1971 | Desai | 156/300 |
| 3,660,219 | 5/1972 | Pugh, Jr. et al. | 264/258 |
| 3,684,632 | 8/1972 | Pedraza | 264/257 |
| 3,695,968 | 10/1972 | Morrison | 428/71 |
| 4,078,348 | 3/1978 | Rothman | 52/192 |
| 4,180,413 | 12/1979 | Diederich | 156/185 |
| 4,258,960 | 3/1981 | Harris | 428/222 |
| 4,353,862 | 10/1982 | Kaman | 264/257 |
| 4,374,693 | 2/1983 | Pitt | 156/292 |
| 4,398,984 | 8/1983 | Uchiyama et al. | 156/196 |
| 4,429,498 | 2/1984 | Pitt | 52/204 |
| 4,734,147 | 3/1988 | Moore | 264/257 |
| 4,923,539 | 5/1990 | Spangler et al. | 156/245 |
| 4,993,740 | 2/1991 | Recher et al. | 264/257 |
| 5,019,199 | 5/1991 | Manke et al. | 156/245 |

Primary Examiner—Jay H. Woo
Assistant Examiner—Robert B. Davis
Attorney, Agent, or Firm—Herbert Dubno

[57] ABSTRACT

The process for the forming of a covering element particularly for vehicle interiors consists in associating at a preset pressure, a wooden plate-like element with a malleable support defined by at least one layer made of a fabric impregnated with a product based on epoxy resin: subsequently, during the application of the pressure, the assembly is heated to a preset temperature to give the wooden plate-like element and the support the pre-required configuration; the covering element obtained with the above process includes a layer of wooden material (2) associated with a support (3) which is defined by at least one layer of fabric impregnated by a product based on epoxy resin.

11 Claims, 1 Drawing Sheet

PROCESS FOR THE FORMING OF A COVERING ELEMENT FOR VEHICLE INTERIORS

FIELD OF THE INVENTION

The present invention relates to a process of forming a covering element particularly for vehicle interiors and to the covering element itself manufactured according to the process.

BACKGROUND OF THE INVENTION

As is known, mechanical means of transport (i.e. vehicles) are mainly made of plastic materials for technical, economical and aesthetical reasons.

The typical fundamental properties of plastic materials in general, are the high ratio between mechanical strength and weight, high impact strength, good weatherability, good resistance to chemical agents, almost zero electric conductivity, high dimensional stability, good ability to elastically absorb vibrations and consequent acoustic deadening, good convertibility by means of rapid and precise mass-production processes, and satisfactory aesthetics making this type of material primarily important for manufacturing of a vehicle.

The interior of any vehicle, be it a motor vehicle, a ship, an aircraft, a train and the like, has furthermore assumed an importance that is fundamental and derives from the technical characteristics of the vehicle.

For example, in the field of car manufacturing, the aesthetics of the interior of a vehicle can even influence the choice of purchasing by a consumer.

Sometimes, however, the use of fine materials, such as for example wood or the like, for the covering of an interior of a vehicle poorly complies with the current need to manufacture vehicles having an extremely low weight, since the weight of the vehicle, the power of the engine, and therefore the fuel consumption and the running costs per kilometer are generally closely interdependent.

For example, in the case of seagoing transport, the weight determines the displacement of the hull, and the resistance of water on the immersed parts mainly depends on the volume of displacement, which is calculated by dividing the displacement in tons by the relative density of water.

The problem worsens in aircraft, in which weight is the main force to be overcome for takeoff.

Consequently, the materials which provide the finishing of the interior of a vehicle, in view of the above, must simultaneously have a low relative density and be aesthetically attractive.

One of the materials still currently most widely used for vehicle interiors is wood and, more precisely, brier.

In the field of car manufacturing, for example, brier, because of its strength, is glued directly onto pre-shaped aluminum supports which are then associated with the vehicle.

Besides, one of the main disadvantages, as regards, for example, the interior of a motor vehicle, is that the materials which constitute it must be able to withstand considerable temperature variations without problems, passing for example from temperatures below zero to much higher temperatures above zero, for example when the vehicle is left in the sun.

In these operating conditions, since the thermal expansion of brier is considerably different from that of aluminum, the brier often tends to separate from the aluminum support or to crack, so that after a relatively short period of time the aesthetic appearance of the brier is completely and inexorably deteriorated.

Aluminum furthermore obviously has a high purchase and processing cost.

Aluminum, before being associated with the brier, must in fact be treated on its surface and requires, in order to obtain a particular configuration, particular dies which have a high cost so that the execution thereof is justified only for mass-productions.

Not least disadvantage of aluminum is also that, despite being one of the lightest metallic materials, its weight penalizes, if used excessively, the lightness of the vehicle.

OBJECTS OF THE INVENTION

It is therefore the principal object of the present invention to provide a process of forming a covering element particularly for vehicle interiors.

Still another object of the invention is to provide a covering element manufactured according to the process which is insensitive to even large temperature variations and has a high ratio between mechanical strength and weight.

Another object of the present invention is to provide a process of forming a covering element particularly for vehicle interiors and a covering element manufactured according to the process which has high impact strength, weatherability and resistance to chemical agents, and also has an almost nil electric conductivity, has dimensional stability and an ability to elastically absorb vibrations, with the consequent acoustic deadening.

Still a further object of the present invention is to provide a process of forming of a covering element, particularly, for vehicle interiors and a covering element manufactured according to the process which can be easily shaped by means of rapid and precise mass-production treatments and is attractively designed.

SUMMARY OF THE INVENTION

These objects are achieved by a process of forming a covering element, particularly for vehicle interiors including the steps of:

impregnating a fabric with a product based on epoxy resin;

drying the impregnated fabric in an oven at a preset temperature and for a preset time until a dry and malleable support is obtained;

associating a wooden plate-like element with the support, exerting a preset pressure; and heating the support associated with the wooden plate-like element for a preset time at a temperature which is substantially higher than the drying temperature during the application of the pressure, so as to obtain a covering element which has the required configuration and rigidity.

The covering element, particularly for vehicle interiors obtained by means of the above process is characterized in that it comprises a layer of wooden material associated with a support defined by at least one layer of fabric impregnated with a product based on epoxy resin.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
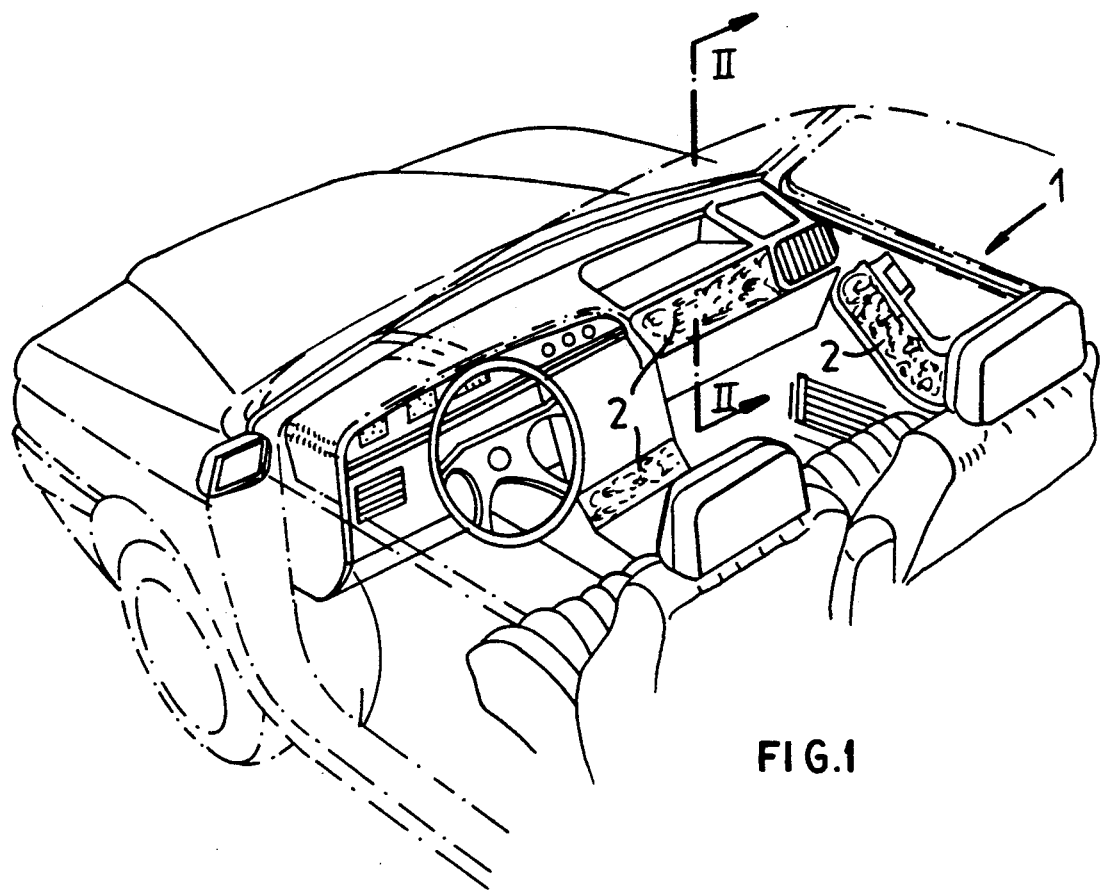
FIG. 1 is a schematic perspective view of an interior of a motor vehicle which has brier covering elements executed according to the invention.

With reference to the above figures, the process according to the invention is performed as follows.

A woven or non-woven fabric, for example, made of glass fiber or cotton, defined by one or more layers, is prepared initially, and each layer is individually impregnated with a product based on epoxy resin.

In particular, the epoxy resin-based product is composed of liquid epoxy resin which has an average relative molecular weight equal to 400 in a percentage substantially equal to 10%; of a solid epoxy resin having an average relative molecular mass equal to 800 in a percentage substantially equal to 10%; of a hardness regulator defined by a trifunctional or tetrafunctional epoxy resin in a percentage substantially equal to 75%; and of a reaction catalyst which is present in a percentage substantially equal to 5%.

Generally, the amount of epoxy resin-based product which is used per amount of fabric to be impregnated is substantially comprised between 200 and 400 g/sq.m. for glass fiber fabric and non-woven fabric and between 90 and 250 g/sq.m. for cotton fabric.

Once the various layers are fully impregnated with the epoxy resin-based product, they are passed in an oven which progressively raises the ambient temperature to a temperature close to 100° C. for a time substantially equal to approximately 3 minutes.

Obviously, both, the temperature and the time, are variable according to the percentages of the components used.

When it leaves the oven, the supporting element defined by one or more layers of glass fiber or cotton fabric or non-woven fabric impregnated with an epoxy-resin based product is dry but very malleable according to the percentages of the components used, so that once it has been associated with the brier plate-like element it can assume the pre-required shape simultaneously therewith in the press.

In particular, once the malleable supporting element has left the oven, the wooden plate-like element is associated therewith and a gradual pressure, which can vary from 0.5 to 8 kg per square centimeter, is applied to both for a preset time at a high temperature varying between 120° C. and 180° C.

In this manner one obtains an element which has brier on its surface and is therefore aesthetically pleasant and has a support with such a strength and rigidity characteristics as to favor its application inside vehicles, coverings of interior decoration articles, pieces of furniture and anything which can be covered.

In particular, the basic characteristics of the brier covering element thus obtained are its light weight and its already mentioned chemical-physical properties.

Furthermore, by means of the above described process, as can be easily understood, it is possible to give the brier plate-like element practically any configuration, even one having extremely small bending angles and which, without the brier has all the disadvantages mentioned above; for example, cracks, breakages or splinterings, which are produced by the earlier method.

Essentially, it is possible to state that the brier and the epoxy resin form a unit, i.e. a monolithic body which is even better, from the physical-mechanical point of view, with respect to a solid high-thickness brier element, and can be shaped in any manner even with extremely small bending radii.

Figure 2:
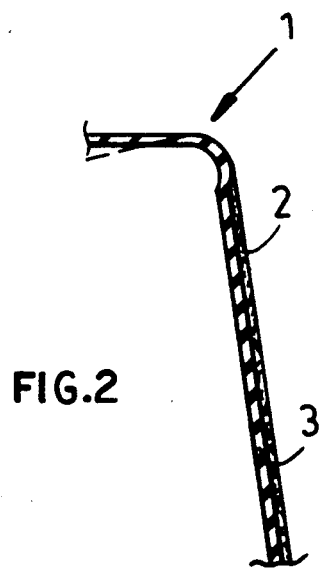
FIG. 2 is a sectional view, taken along the line II—II in FIG. 1, of a covering element according to the invention.

The covering element manufactured according to the described above, and shown in FIG. 2, is generally indicated by the reference numeral 1.

As can be seen, the covering element mainly usable for interiors of means of transport comprises a layer of wooden material 2, for example brier, which is indissolubly associated with a support which is defined by at least one layer of woven or non-woven fabric 3 impregnated by a product based on epoxy resin.

In particular, as already mentioned, the epoxy resin-based product is defined by a liquid epoxy resin and by a solid epoxy resin, which have an average i relative molecular weight equal to 400 and 800 respectively, by a hardness regulator defined by a trifunctional or tetrafunctional epoxy resin, and by a reaction catalyst.

Figure 3:
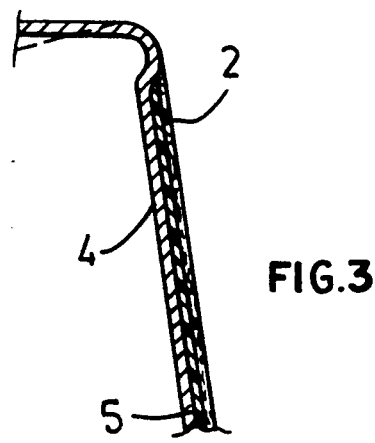
FIG. 3 is a sectional view of a panel along the line II—II in FIG. 1 with an aluminum support in which a layer of fabric impregnated with epoxy resin is interposed between the wood and the aluminum according to the present invention.

In the embodiment illustrated in FIG. 3 instead of the support defined by glass fiber or cotton fabric it is possible to apply the resin, for example, on a metallic material 4 such as aluminum.

In this constructive variated embodiment, in order to prevent the brier from tending to break or splinter, due to its different thermal expansion with respect to the aluminum, a layer defined by a polyester fabric 5, again impregnated with an epoxy resin-based product as described above, is interposed between the two elements.

Obviously, the percentages of the liquid epoxy resin, of the solid epoxy resin, of the hardness regulator and of the reaction catalyst will vary in the epoxy resin-based product of this last solution and will be approximately 30%, substantially 5%, approximately 60% and approximately 5% respectively.

In this case also, in which aluminum is used as main supporting element, the polyester fabric which is impregnated with the epoxy resin-based product is passed in an oven at a temperature close to 100° C. for approximately 4 minutes, and the amount of epoxy resin-based product is substantially equal to 120 grams per square meter.

In this case, the pressure and temperature used during the pressing of the aluminum simultaneously with the brier plate-like element are substantially equal to those mentioned for glass fiber or cotton fabric.

The invention achieves the proposed aim and objects and furthermore has important and numerous advantages.

Among these, it should be mentioned that, besides the aesthetic appearance of the brier and the extremely low cost of the panel or covering element, it achieves a high ratio between mechanical strength and weight, impact strength, weatherability and resistance to chemical agents, almost nil electric conductivity, dimensional stability, ability to elastically absorb vibrations with consequent acoustic deadening, which make the product according to the invention extremely suitable for the current requirements for the finishing or manufacturing of interiors of means of transport or of any type of covering.

The process and the covering element which form the subject of the invention can furthermore be advantageous foremost for small production lines.

The invention thus conceived is susceptible to numerous modifications and variations, all of which are within the scope of the present inventive concept.

All the details may furthermore be replaced with technically equivalent elements.

The materials employed, the shapes and the dimensions may be any according to the requirements.

I claim:

1. A process for forming a covering element, for a vehicle interior, said process comprising the steps of:
   (a) impregnating at least one inner layer of fabric with an epoxy resin based product;
   (b) drying said inner layer impregnated with said product in an oven at a first predetermined temperature and for a period sufficient to form a malleable inner dry support
   (c) thereafter applying an outer rigid plate to said malleable support and shaping said plate simultaneously with said support upon pressing said plate against said support at a preset pressure and a second temperature higher than said first temperature and for a period of time not exceeding four minutes to form said covering element with a given configuration and with a required rigidity and said plate bonded to said support to conform an outer contour of the vehicle interior for imparting an aesthetic appearance thereto.

2. The process defined in claim 1 wherein said fabric is made of glass fiber and is defined by one or more individually impregnated layers.

3. The process defined in claim 1 wherein said fabric is made of cotton and is defined by one or more individually impregnated layers.

4. The process defined in claim 1 wherein said epoxy resin-based product comprises a percentage of a liquid epoxy resin, a percentage of a solid epoxy resin, a hardness regulator and a reaction catalyst.

5. The process defined in claim 1 wherein said first temperature is comprised between 80 and 110 degrees.

6. The process defined in claim 1 wherein said fabric is impregnated with said epoxy-resin product in an amount comprised between 80 and 200 g/sq.m.

7. The process defined in claim 1 wherein said pressure is comprised between 0.5 and 8 kg/sq.cm. at a temperature comprised between 120 and 180 degrees.

8. The process defined in claim 1 wherein said liquid epoxy resin has an average relative molecular weight equal to 400 and that said solid epoxy resin has an average relative molecular weight equal to 800.

9. The process defined in claim 1 further comprising the step of bonding said covering element at said pressure.

10. The method as defined in claim 1 wherein said rigid plate is a wooden plate.

11. The method as defined in claim 1 wherein said rigid plate is an aluminum plate. i

* * * * *